(12) United States Patent
Okutani et al.

(10) Patent No.: US 8,439,983 B2
(45) Date of Patent: May 14, 2013

(54) SEALED BATTERY WITH ELECTRODE TERMINAL WELDED TO CURRENT COLLECTOR, AND MANUFACTURING METHOD FOR THE SAME

(75) Inventors: Eiji Okutani, Osaka (JP); Atsushi Obayashi, Osaka (JP); Tomokazu Yamanaka, Osaka (JP); Yoshikumi Miyamoto, Osaka (JP); Ryuji Oshita, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 733 days.

(21) Appl. No.: 12/059,746

(22) Filed: Mar. 31, 2008

(65) Prior Publication Data

US 2008/0241679 A1    Oct. 2, 2008

(30) Foreign Application Priority Data

Mar. 30, 2007 (JP) .................................. 2007-093028

(51) Int. Cl.
*H01M 2/04* (2006.01)
(52) U.S. Cl.
USPC .......................... 29/623.2; 429/185; 429/175
(58) Field of Classification Search .................. 429/175, 429/185
See application file for complete search history.

(56) References Cited

U.S. PATENT DOCUMENTS

| 2002/0009634 | A1 | 1/2002 | Oogaku |
| 2005/0095502 | A1* | 5/2005 | Sugimune et al. ............ 429/180 |

FOREIGN PATENT DOCUMENTS

| JP | 2001-291506 A | 10/2001 |
| JP | 2002-042779 A | 2/2002 |
| JP | 2003-272604 A | 9/2003 |
| JP | 2004-014173 A | 1/2004 |

OTHER PUBLICATIONS

Japanese Office Action dated Mar. 23, 2012, issued in corresponding Japanese Patent Application No. 2007-093028, (3 pages).

* cited by examiner

*Primary Examiner* — Maria J Laios
(74) *Attorney, Agent, or Firm* — Westerman, Hattori, Daniels & Adrian, LLP (57) ABSTRACT

Provided is a sealed battery that can offer excellent battery performances by having its electrode terminal and a current collector securely welded to each other, and its manufacturing method. The sealed battery is formed by hermetically sealing a casing storing an electrode assembly and the current collector, wherein: the electrode assembly formed by layering positive and negative electrode plates with a separator sandwiched therebetween is electrically connected to the current collector; and a shaft portion of the electrode terminal penetrates through the current collector. A part of the electrode terminal projecting out from a pass-through of the current collector is a (conical) frustum-shaped portion whose bottom base is in contact with the current collector. The frustum-shaped portion is pressed against the current collector, and the frustum-shaped portion and the current collector are welded together in at least one area on a perimeter of the bottom base of the frustum-shaped portion.

4 Claims, 6 Drawing Sheets

FIG.5C
Prior Art     FIRST PRESSING STEP

FLARE

FIG.5D
Prior Art     SECOND PRESSING STEP

SEALED BATTERY WITH ELECTRODE TERMINAL WELDED TO CURRENT COLLECTOR, AND MANUFACTURING METHOD FOR THE SAME

BACKGROUND OF THE INVENTION (1) Field of the Invention

The present invention relates to a sealed battery and a manufacturing method for the same, and in particular to technology for properly welding an electrode terminal to a current collector in the manufacturing process.

(2) Description of the Related Art

In recent years, mobile electronic devices, such as mobile phones and personal digital assistants (PDAs), have been disseminated rapidly.

In these electronic devices, sealed batteries, such as nickel-metal hydride (Ni-MH) batteries and lithium-ion batteries, are frequently used as high-energy density power sources.

Generally, a sealed battery is formed by storing an electrode assembly and electrolyte into a rectangular external casing with a closed bottom, then sealing an opening in the external casing with a sealing plate (note, the shape of the external casing is not limited to a rectangular shape). The electrode assembly is formed, for example, by rolling a negative electrode plate and a positive electrode plate that have been layered with a belt-like separator sandwiched therebetween. The negative electrode plate is connected via a lead tab to a current collector. The current collector is connected to an electrode terminal (negative electrode terminal) provided in a sealing assembly. The positive electrode plate is connected via another lead tab to the external casing that also functions as a positive electrode terminal.

A manufacturing process for a sealed battery is described in, for example, Japanese Laid-Open Patent Applications No. 2003-272604 and No. 2001-291506. The following is one example of methods described in these documents. To begin with, the electrode assembly is stored into a rectangular external casing that is made of nickel-plated steel. As shown in cross-sectional views of FIGS. 5A-5D, a sealing plate 160, spacer 20, current collector 22, etc. are overlayed in listed order, then the layer is penetrated by a shaft portion 181 of an electrode terminal element 18x via a gasket 17 (FIGS. 5A-5D). Here, the shaft portion 181 penetrates through the current collector 22 by passing through a pass-through 220 provided in the current collector 22, in such a manner that an apical portion 187 projects out from the current collector, the apical portion 187 being provided in a first end of the shaft portion 181 in the penetration direction. Once the shaft portion 181 penetrates through the current collector 22, the apical portion 187 of the electrode terminal element 18x, which has an opening 185, is expanded diametrically to form a plate-like portion 182x by flaring the opening 185 with a jig inserted thereinto.

Figure 5A:
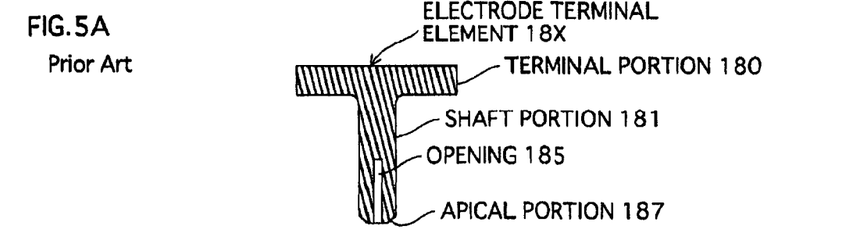
FIGS. 5A-5D show parts of a manufacturing process for a conventional battery (a manufacturing process for a conventional sealing assembly)
Figure 5B:
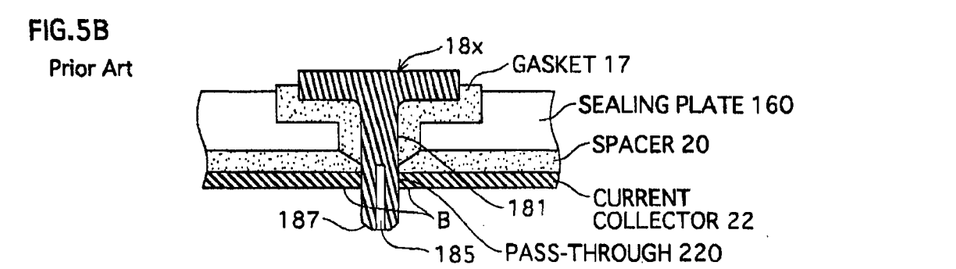
Figure 5C:
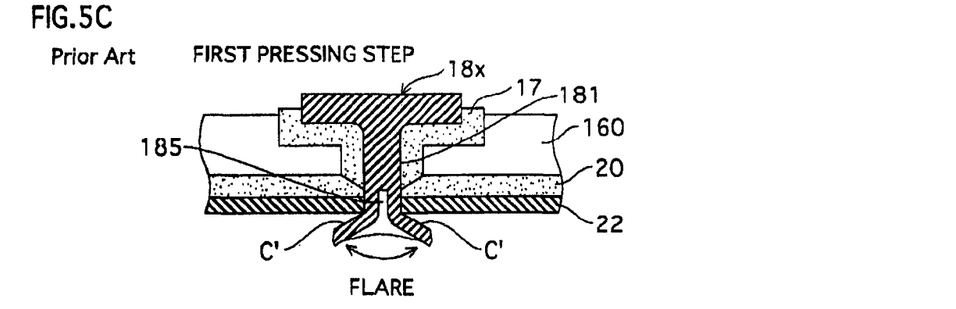
Figure 5D:
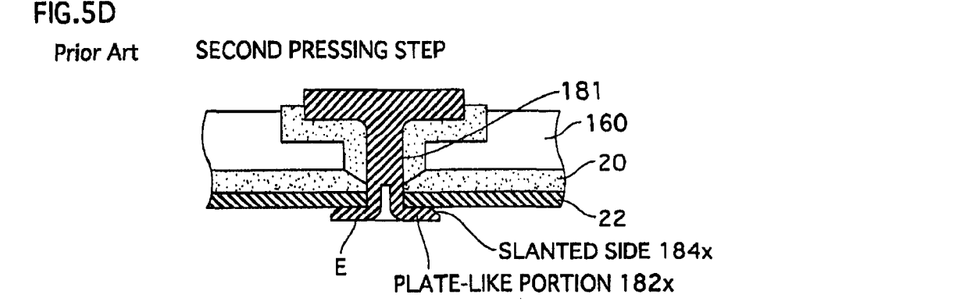

Next, the plate-like portion 182x is pressed against the current collector 22 in a plurality of steps (here, in two steps), such that a main surface C' of the plate-like portion 182x comes into contact with a main surface B of the current collector 22 (FIGS. 5C-5D). In a case where the plate-like portion 182x has come into contact with the current collector 22 only by getting pressed thereagainst, the electrical resistance of the battery becomes unstable from the infiltration of electrolyte or the like into between the plate-like portion 182x and the current collector 22. For this reason, a laser beam is applied to a part of the pressed area to weld the plate-like portion 182x to the current collector 22, the laser beam being emitted from the proximity of the plate-like portion 182x and perpendicular to its another surface E which is exposed to an external space and is farther away from the current collector 22 (FIG. 6A).

Then, the lead tab extending from the electrode assembly is connected to the current collector 22. The sealing plate is fit into and welded to the opening in the external casing. Electrolyte is inserted inside the battery through a filler hole provided in the sealing plate. Finally, the battery is sealed by plugging the filler hole with a sealing plug.

However, there is a problem in the conventional manufacturing process for a sealed battery: deficiencies in battery performance may arise due to insufficient welding between an electrode terminal and a current collector, as will be described below.

Figure 6A:
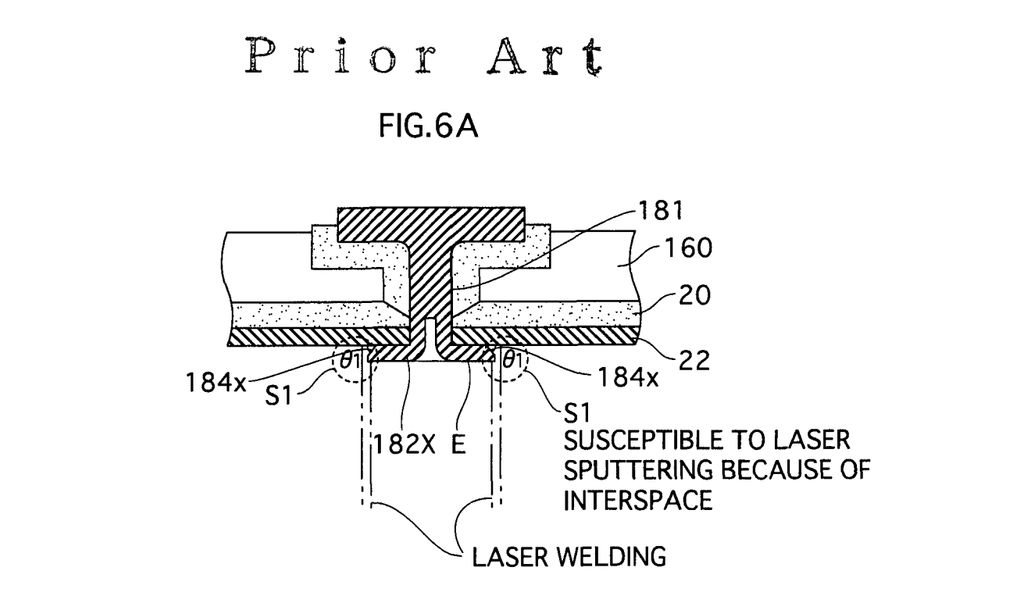
FIGS. 6A-6B show the manufacturing process for the conventional battery (the manufacturing process for the conventional sealing assembly), as well as problems pertaining thereto.

As shown in an area S1 of FIG. 6A, the plate-like portion 182x has a slanted side 184x. The slanted side 184 makes an acute angle $\theta 1$ with the main surface B of the current collector 22. Here, in order to properly perform laser-welding, it is necessary to partially melt the plate-like portion 182x and the current collector 22 by applying a laser beam to the proximity of a perimeter of an interface between the plate-like portion 182x and the current collector 22.

Assume a case where a laser beam is applied in the area S1 so as to weld the plate-like portion 182x to the current collector 22, the laser beam being emitted from the proximity of the plate-like portion 182x and perpendicular to its surface E. The problem here is that the slanted side 184, as well as a part of the main surface B that is surrounded by the slanted side 184, is not exposed to the laser beam because a perimeter of the surface E blocks the laser beam.

Figure 6B:
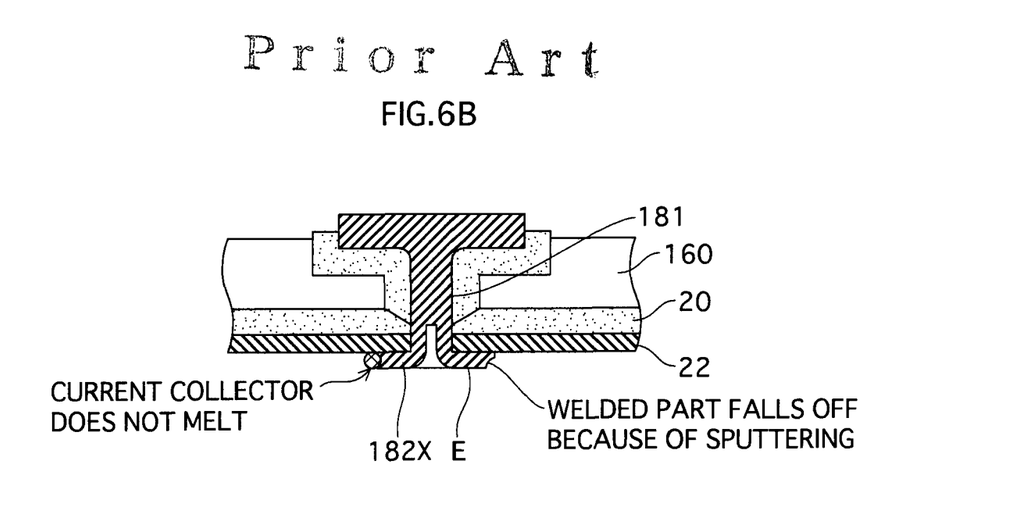

This may give rise to the following problems: (i) only the proximity of the slanted side 184x melts from receiving thermal energy provided by the laser beam, leaving the current collector 22 and the plate-like portion 182x unmerged; and (ii) due to the interspace between the slanted side 184x and the part of the main surface B that is surrounded by the slanted side 184x, the perimeter of the surface E intensively receives the thermal energy from the laser beam and eventually gets sputtered and comes off from overheat, as shown in FIG. 6B.

Such problems caused by poor welding could not only damage the stability of electrical conductivity between the electrode terminal and the current collector, but also cause the sputtered, fallen portion to enter inside the electrode assembly and trigger a short circuit. These problems should thus be solved immediately so as to achieve a proper battery performance.

SUMMARY OF THE INVENTION

The present invention is provided in view of the above problems. It is an object of the present invention to provide a sealed battery that can offer great battery performances and a manufacturing method therefor, by unfailingly welding an electrode terminal and a current collector.

In order to solve the above problem, the present invention is a sealed battery formed by hermetically sealing an external casing storing therein an electrode assembly that is (i) electrically connected to a current collector and (ii) formed by layering a positive electrode plate and a negative electrode plate with a separator sandwiched therebetween, the current collector being welded together with an electrode terminal, wherein: the electrode terminal is composed of (i) a shaft portion, (ii) a terminal portion provided in a first end of the shaft portion and (iii) a frustum-shaped portion provided in a second end of the shaft portion; the shaft portion penetrates through the current collector such that the frustum-shaped portion projects out from the current collector; the frustum-shaped portion has been pressed against the current collector such that a bottom base of the frustum-shaped portion comes into contact with the current collector; and the bottom base of the frustum-shaped portion and the current collector have been welded together in at least one area on a perimeter of the bottom base of the frustum-shaped portion.

In the sealed battery, the frustum-shaped portion may be an expanded portion formed by diametrically expanding a shaft-like apical portion that (i) is provided in the second end of the shaft portion and (ii) has an opening that connects to an external space in the penetration direction. Here, the shaft-like apical portion is diametrically expanded by flaring the opening with a jig inserted thereinto.

In the sealed battery, the welding may be a laser beam spot-welding.

The frustum-shaped portion may have a shape of a conical frustum.

The present invention also provides a manufacturing method for a sealed battery, comprising: a first step of (i) causing a terminal element, which is composed of a shaft portion and an apical portion provided in a first end of the shaft portion, to penetrate through a current collector such that the apical portion projects out from the current collector, (ii) shaping the apical portion into a plate-like portion by expanding the apical portion diametrically and (iii) pressing the plate-like portion against the current collector; a second step of shaping the plate-like portion into a frustum-shaped portion whose bottom base is facing the current collector; and a third step of welding the bottom base of the frustum-shaped portion and the current collector together in at least one area on a perimeter of the bottom base of the frustum-shaped portion, such that the bottom base of the frustum-shaped portion is in contact with the current collector.

In the second step of the manufacturing method, the plate-like portion may be shaped into the frustum-shaped portion by deforming the plate-like portion using a pressing die.

The present invention also provides a manufacturing method for a sealed battery, comprising: a first step of causing a terminal element, which is composed of a shaft portion and an apical portion provided in a first end of the shaft portion, to penetrate through a current collector such that the apical portion projects out from the current collector, wherein the apical portion has a cup-shaped opening that connects to an external space in the penetration direction; a second step of forming a frustum-shaped portion whose bottom base is facing the current collector by (i) diametrically expanding the apical portion by flaring the cup-shaped opening with a jig inserted thereinto and (ii) pressing the frustum-shaped portion against the current collector; and a third step of welding the frustum-shaped portion and the current collector in at least one area on a perimeter of the bottom base of the frustum-shaped portion.

According to the sealed battery of the present invention having the above-described structure, the shaft portion of the electrode terminal, which has penetrated through the current collector, has the frustum-shaped portion (e.g., a conical frustum-shaped portion) whose bottom base is adjacent to the main surface of the current collector, the bottom base of the frustum-shaped portion having a larger surface area than a top base thereof.

This structure allows making the entire bottom base of the frustum-shaped portion come into contact closely with the main surface of the current collector with no space therebetween. When viewing the top base of the frustum-shaped portion perpendicular thereto, the perimeter of the bottom base of the frustum-shaped portion, as well as the current collector therearound, is exposed to the external space in the proximity of the tapered slanted side of the frustum-shaped portion.

Accordingly, when welding the frustum-shaped portion to the current collector by, for example, applying a laser beam perpendicular to the top base of the conical frustum-shaped portion, the laser beam is applied evenly and properly to the perimeter of the bottom base of the conical frustum-shaped portion and the part of the current collector therearound.

As a result, both the conical frustum-shaped portion and the current collector melt from receiving energy from the laser beam. Their molten portions merge and solidify. This forms an even weld spot.

Unlike conventional technologies, the present invention can form an excellent weld spot and thereby prevent the following problems: (i) only the electrode terminal melts during the laser-welding, leaving the electrode terminal and the current collector unmerged and resulting in poor welding; and (ii) an internal short circuit occurs due to sputtering/falling of a part of the conical frustum-shaped portion.

Therefore, with the above-described structure, the manufacturing method for the sealed battery of the present invention can not only alleviate an increase in the internal resistance triggered by poor welding, but also offer stable battery performance even under an undesirable condition, such as when electrolyte infiltrates into between the electrode terminal and the current collector during use.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

The following describes embodiments of the present invention. However, the present invention is of course not limited to these embodiments, and may be implemented in a variety of forms without departing from the technical scope of the invention.

<First Embodiment>
1. Structure of Sealed Battery

Figure 1:
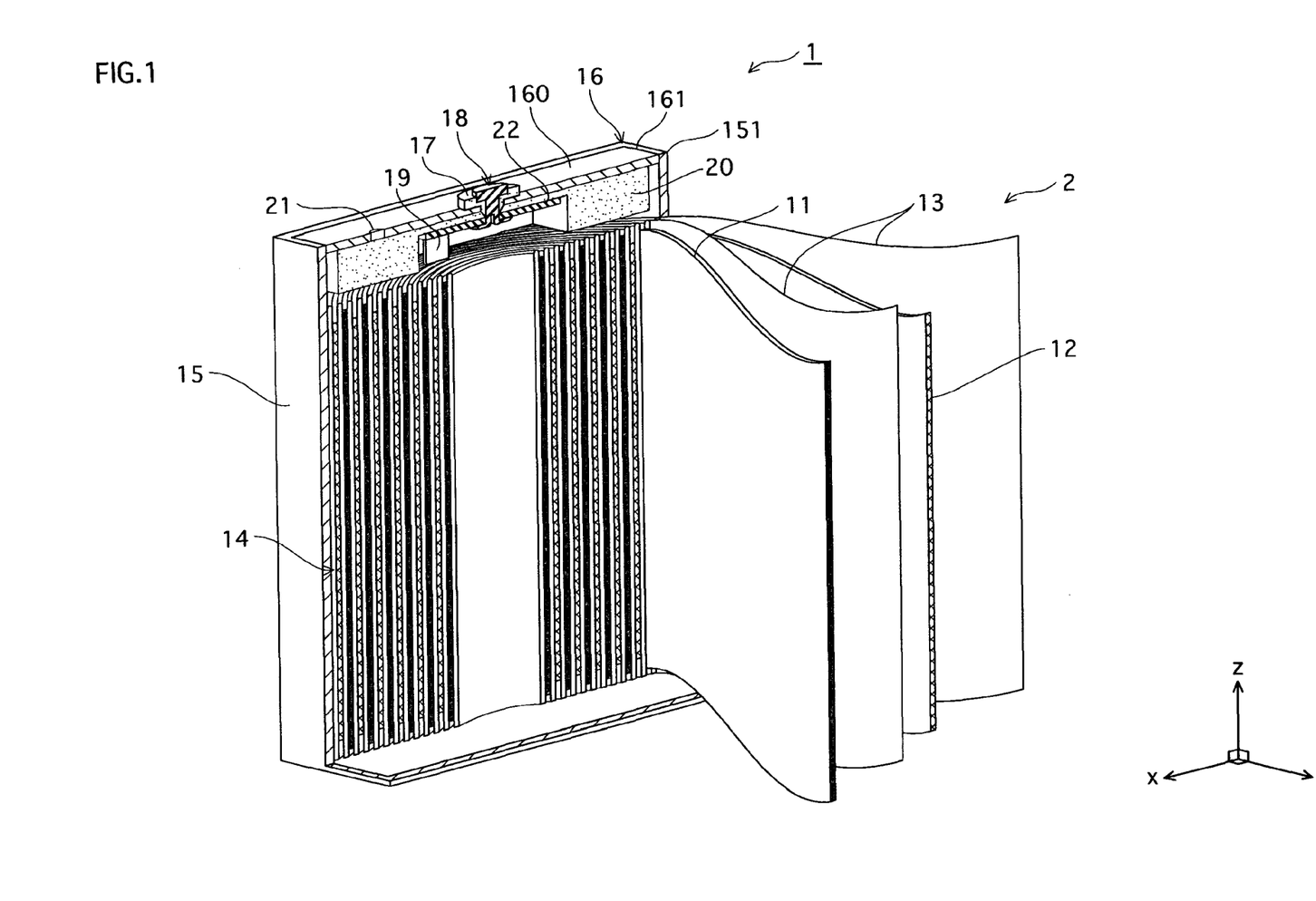
FIG. 1 shows a cross-sectional view showing a structure of a sealed rectangular battery pertaining to a first embodiment of the present invention.

FIG. 1 shows a perspective, cross-sectional view showing a structure of a sealed battery, which is one embodiment of the present invention (hereafter, simply "battery 1").

The battery 1 is a rectangular lithium-ion battery and is primarily composed of a sealing assembly 16, an electrode assembly 14 and a rectangular external casing 15 (hereafter, simply "external casing 15"). Here, the battery 1 has the following exemplary measurements: 42.5 mm in height (z-direction)×33.7 mm in width (x direction)×4.2 mm in depth (y-direction).

The external casing 15 has a rectangular external body with a closed bottom, and formed by subjecting an aluminum alloy plate to a drawing process. The rolled electrode assembly 14 and a predetermined amount of electrolyte are stored into the external casing 15. The external casing 15 is sealed by laser-welding a rim 161 of a sealing plate 160 in the sealing assembly 16 to an opening 151 of the external casing 15.

The sealing assembly 16 is composed of the sealing plate 160, which is stamped out from an aluminum alloy plate, and a spacer 20, which is provided below the sealing plate 160 facing a main surface of the sealing plate 160. The sealing assembly 16 is constructed in such a manner that a negative electrode terminal 18 penetrates through the center of the sealing plate 160 and the spacer 20 via a gasket 17. A filler hole 21 is formed in the sealing plate 160 for inserting electrolyte therethrough into the external casing 15 in the manufacturing process. Once the external casing 15 is filled with electrolyte, the filler hole 21 is plugged.

Figure 2A:
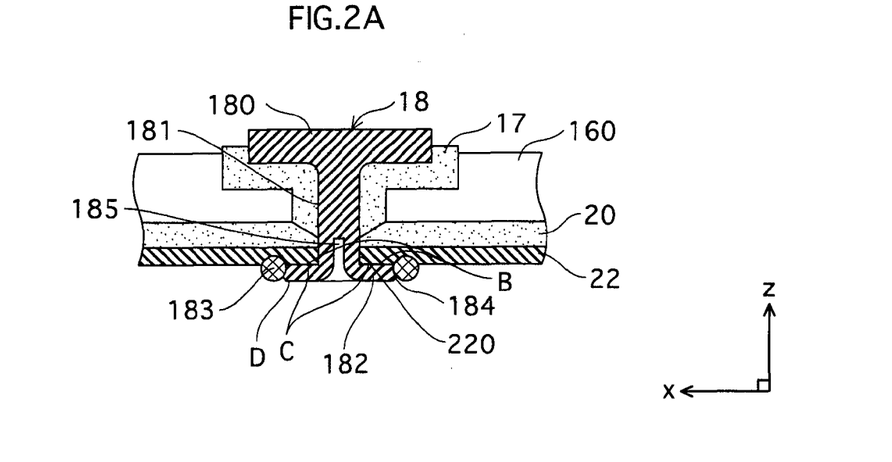
FIGS. 2A-2C show the structure of the battery pertaining to the first embodiment around a current collector and a positive electrode terminal.

The negative electrode terminal 18 is made of nickel. As shown in FIG. 2A, the negative electrode terminal 18 is composed of: a disk-shaped terminal portion 180 positioned outside the battery 1; a shaft portion 181 with an opening 185 that connects to the external space; and a conical frustum-shaped portion 182 (a portion to be pressed) formed by pressing an apical portion 187 that is provided in a first end of the shaft portion 181. The first embodiment is different from conventional battery structures in that the conical frustum-shaped portion 182 is provided in the first end of the shaft portion 181 of the negative electrode terminal 18, the shaft portion 181 penetrating through the current collector 22 and partially protruding out from a main surface B thereof by passing through a pass-through 220 provided along the thickness direction of the current collector 22.

Figure 2B:
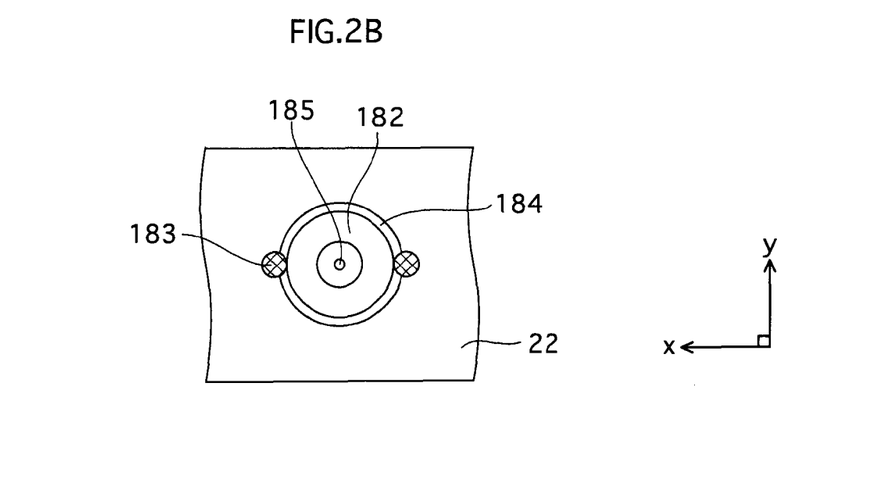

A bottom base C of the conical frustum-shaped portion 182 is pressed against and thus in contact with the main surface B of the current collector 22 in the proximity of the pass-through 220. Then, as shown in FIG. 2B, the conical frustum-shaped portion 182 and the current collector 22 are laser-welded at a plurality of weld spots 183. FIG. 2B shows an example where there are two weld spots 183. Here, the welding method of this invention is not limited to the one described above. For example, it is permissible to provide a substantial linear weld area within a predetermined area such that each spot overlap with one another.

The spacer 20 is made by injection molding an insulation material (e.g., polypropylene). Provided around the opening 151 of the external casing 15, the spacer 20 holds the electrode assembly 14 against the bottom of the external casing 15 and protects the electrode assembly 14 from vibration.

The current collector 22 is made of a metal plate with a high electrical conductivity. The bottom base C of the conical frustum-shaped portion 182 has been pressed against and thus in contact with the main surface B of the current collector 22 in the proximity of the pass-through 220. Later the conical frustum-shaped portion 182 and the current collector 22 are laser-welded. The current collector 22 is connected by resistance welding via a lead tab 19 to a negative electrode plate 12 of the electrode assembly 14, the lead tab being made of a nickel-plated conductor material.

The electrode assembly 14 is formed by rolling a positive electrode plate 11, a separator 13, a negative electrode plate 12, and another separator 13 that are layered over one another in listed order (these are all belt-like). The rolled layer is then placed on its side and flattened to give the rolled layer a flat cross-section.

In order to secure energy density, it is desirable that a capacity of the electrode assembly 14 is set as large as possible in accordance with a volume of the external casing 15.

The positive electrode plate 11 is formed by applying a positive electrode mixture composed of a conductive agent and a binding agent onto a surface of a positive electrode core (e.g., aluminum), wherein a major constituent of the positive electrode mixture is a lithium cobalt composite oxide (e.g., $LiCoO_2$) which is the active material for the positive electrode. The positive electrode plate 11 is electrically connected via a conductive tab (not illustrated) to an inner wall of the external casing 15. This makes the bottom of the external casing 15 function as the positive electrode terminal.

The negative electrode plate 12 is formed by applying a negative electrode mixture composed of a conductive agent and a binding agent onto a surface of a negative electrode core (e.g., copper), wherein a major constituent of the negative electrode mixture is a carbonaceous material which is the active material for the negative electrode.

Each separator 13 is a microporous film made of polyethylene and is used to insulate the positive electrode plate 11 from the negative electrode plate 12. Each separator 13 has a temperature limit of up to approximately 120° C.

In FIG. 1, for simplicity, each separator 13 has a rectangular shape and its size is about the same as the positive and negative electrode plates 11 and 12. However, it is permissible that one of these separators 13 is formed in the shape of an envelope, so that the positive electrode plate 11 can be inserted into the envelope-like separator 13 to insulate itself from the negative electrode plate 12.

The electrolyte, which is impregnated into the electrode assembly 14, has a nonaqueous composition, such as $1MLiPF_6$-EC/DMC (ratio by volume is EC:DMC=30:70 at 25 degrees C.).

The lithium-ion battery 1 with the above-described structure produces the following phenomena while being charged. In the positive electrode plate 11, lithium included in lithium cobalt oxide develops into an ion ($Li \rightarrow Li^+ + e^-$), and a lithium ion ($Li^+$) moves through the separators 13 to the negative electrode plate 12.

Meanwhile, in the negative electrode plate 12, the lithium ion $Li^+$ is incorporated into layers of a carbon crystal that constitutes graphite.

When in a discharge state, the lithium-ion battery 1 exhibits a battery reaction that is opposite to the above, externally providing power (e.g., 800 m Ah).

Figure 4A:
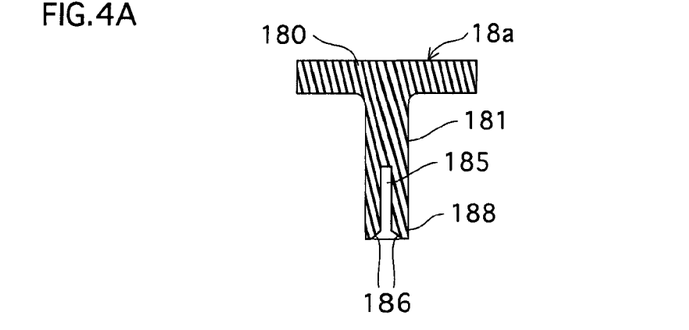
FIGS. 4A-4D show parts of a manufacturing process for a battery (a manufacturing process for a sealing assembly) pertaining to a second embodiment.
Figure 4B:
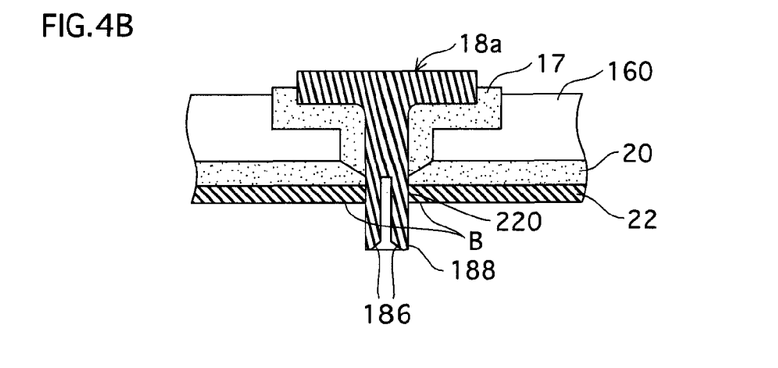
Figure 4C:
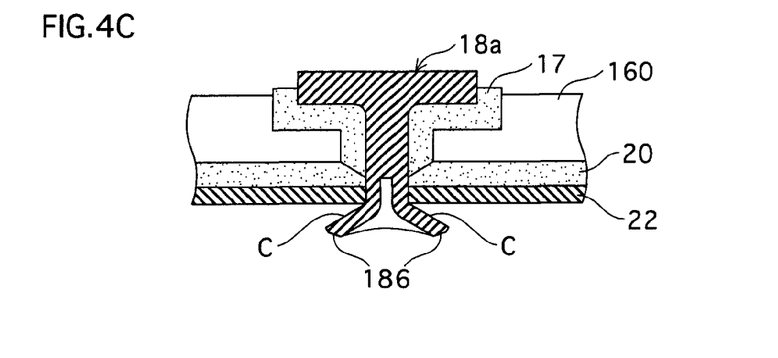
Figure 4D:
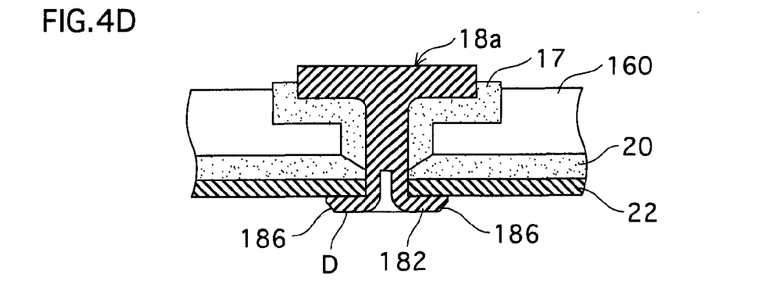

The characteristic of the battery 1 lies in its structure around the weld spots connecting the conical frustum-shaped portion 182 of the negative electrode terminal 18 and the current collector 22. That is, as shown in FIG. 4D, the conical frustum-shaped portion 182 of the negative electrode terminal 18 has its entire bottom base C in contact with the main surface B of the current collector 22 and its top base D located away from the current collector 22 (the bottom base C has a larger surface area than the top base D).

With this structure, the diameter of the conical frustum-shaped portion 182 is smaller toward its top base D. That is, the conical frustum-shaped portion 182 is tapered to make a slanted side 184. The slanted side 184 and the main surface B form an obtuse angle θ2. It should be noted that, specifically, the angle θ2 is desirably in the range of 120 degrees to 150 degrees, inclusive.

This conical frustum-shaped portion 182 offers the following advantage. In the manufacturing process, in a case where a laser beam is emitted either perpendicular to the top base D (opposite of the z direction) or nearly perpendicular to the top base D (e.g., at an angle approximately 10 degrees off the right angle), the laser beam is applied to an area on both the current collector 22 and a perimeter of the bottom base C of the conical frustum-shaped portion 182. This way the current collector 22 and the conical frustum-shaped portion 182 are melted in the stated area; the molten portions then merge and become solid to fix each other. This makes possible excellent spot welding.

The following are descriptions of the aforementioned characteristic and a manufacturing process of the sealing assembly 16.

2. Manufacturing Process of Sealing Assembly 16

As will be described below, in the manufacturing process pertaining to the first embodiment, the following steps are taken in listed order: (i) a forming step to form the conical frustum-shaped portion 182 and (ii) a welding step to weld the conical frustum-shaped portion 182 to the current collector 22.

First, an electrode terminal element 18x (the negative electrode terminal 18, yet to be pressed) is provided (aforementioned FIG. 5A). Then the shaft portion of the electrode terminal element 18x is arranged in such a manner that it penetrates via the insulative gasket 17 through the sealing plate 160, the spacer 20 and the pass-through 220 of the current collector 22 in listed order (FIG. 5B).

Second, with use of a certain type of pressing die, the apical portion 187 around the opening 185 is pressed and expanded diametrically—i.e., in the direction orthogonal to the axis of the shaft portion 181 (here, in the horizontal direction)—by flaring the opening 185 with a jig inserted thereinto. This is called a diametrically expanding step. (Note, the apical portion 187 is provided in the first end of the shaft portion 181 that has penetrated through the current collector 22. The opening 185 has been provided in the apical portion 187 parallel thereto and connects to the external space.) This pressing process is performed in a plurality of steps (two steps shown in FIGS. 5C and 5D), with the result that the apical portion 187 is expanded diametrically. This forms the plate-like portion 182x (FIG. 5D).

Figure 3A:
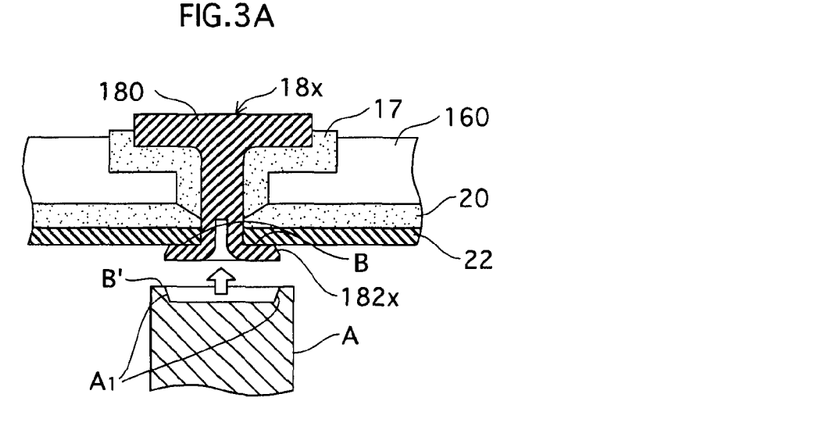
FIGS. 3A-3C show parts of a manufacturing process for the battery (a manufacturing process for a sealing assembly) pertaining to the first embodiment.
Figure 3B:
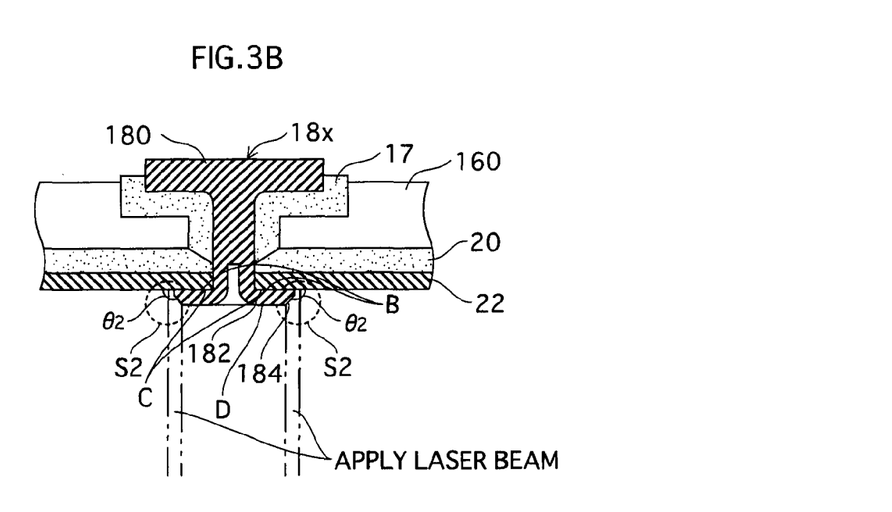

Next, a pressing die A shown in FIG. 3A is provided. Here, a surface B' of the processing punch A has a depression that is complementary to the plate-like portion 182x having a shape of a conical frustum. The depression has a slanted side A1 that makes a predetermined angle with a depressed surface of the pressing die A (e.g., a line parallel to the main surface B and the slanted side A1 form an angle of 2π-θ2). Then, the pressing die A is pressed against the plate-like portion 18x in such a manner that the slanted side A1 is directly in contact with the perimeter of the plate-like portion 182x. This is the forming step of partially deforming the plate-like portion 182x (FIG. 3A). As a result, the plate-like portion 182x turns into the conical frustum-shaped portion 182 (FIG. 3B). Upon formation of the conical frustum-shaped portion 182, its slanted side 184 makes an obtuse angle θ2 with the main surface B that is exposed to the external space around the slanted side 184 (FIG. 3B).

Figure 3C:
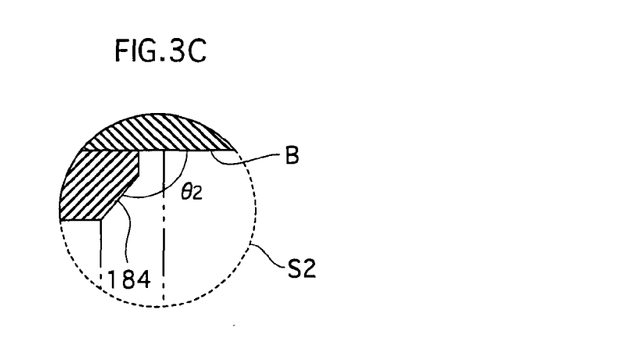

Next, the welding step is performed, in which the laser beam is applied either perpendicular or nearly perpendicular to the top base D of the conical frustum-shaped portion 182. FIG. 3C is an enlarged view of an area S2 shown in FIG. 3B. The laser beam is applied to an area on, at least, the slanted side 184 and the main surface B which is exposed to the external space around the slanted side 184.

Here, in the area S2, the entire bottom base C of the conical frustum-shaped portion 182 is properly bonded with the main surface B of the current collector 22. The slanted side 184, as well as the part of the main surface B surrounding the slanted side 184, is exposed to the laser beam emitted perpendicular to the main surface B. Hence, energy of the laser beam evenly reaches both the current collector 22 and the slanted side 184 that then melt, merge and solidify. This forms a weld spot (a weld nugget) in an area subjected to the laser-welding. The aforementioned process makes the sealing assembly 16.

As has been described above, in the first embodiment, the slanted side 184, as well as the part of the main surface B surrounding the slanted side 184, is exposed to the laser beam emitted in the welding step. As opposed to conventional technologies, the plate-like portion 182x of the present embodiment does not shield the current collector 22 from the laser beam. It is thus possible to prevent several problems, such as poor welding, sputtering/falling of a part of a component, etc., and to properly weld the conical frustum-shaped portion 182 to the current collector 22.

It should be noted that, depending on the method of pressing the apical portion 187 against the current collector 22, there may be a case where the entire bottom base C of the conical frustum-shaped portion 182 is not in contact with the main surface B, but only a part (e.g., the perimeter) of the bottom base B is in contact with the main surface B. However, even in such a case, the laser beam is applied in the welding step to the area S2 where the current collector 22 and the conical frustum-shaped portion 182 are bonded with each other. This forms an excellent weld spot 183.

The "conical frustum-shaped portion" of the present invention does not have to be in a mathematically defined shape. It is permissible that the conical frustum-shaped portion is roughly in a shape of a conical frustum. A somewhat deformed conical frustum-shaped portion is acceptable. More specifically, the conical frustum-shaped portion may have any substantial shape formed by the pressing process etc. For example, the conical frustum-shaped portion may have a depression in the center of its top base D.

Furthermore, the top base D of the conical frustum-shaped portion 182 does not need to have a perfectly flat surface, but may have a bulgy surface extending from the slanted side 184. More specifically, it is permissible to form the conical frustum-shaped portion 182 in an approximately hemispherical shape, a gentle globular shape, etc.

The bottom base C does not need to have a shape of a circle, either. The perimeter of the bottom base C may include a curved line, or may be polygonal.

<Second Embodiment>

The following describes the second embodiment, with a focus on differences between the first and second embodiments.

In the first embodiment, the conical frustum-shaped portion 182 is formed in the forming step by first pressing the apical portion 187 against the current collector 22 and then deforming the plate-like portion 182x using the pressing die A. This manufacturing method, however, is not a limitation of the present invention.

FIGS. 4A-4D show a manufacturing method pertaining to the second embodiment. As shown in the method in these FIGs., it is permissible to use an electrode terminal element 18a that has the following structure. The electrode terminal element 18a has a shaft portion 181 and an apical portion 188 provided in a first end of the shaft portion 181. In the axis direction of the shaft portion, the apical portion has a cup-like opening 185 that connects to the external space and has a slanted side 186.

The electrode terminal element 18a having the above-described structure makes possible the following manufacturing method. The sealing plate 160, the spacer 20 and the pass-through 220 of the current collector 22 are penetrated by the apical portion 188 and the shaft portion 181 (an insertion step, FIGS. 4A-4B). Next, the first pressing step is performed—i.e., the apical portion 188 is diametrically expanded halfway by flaring the opening 185 with a jig inserted thereinto. Then, the second pressing step is performed—i.e., the apical portion 188 is further expanded diametrically by further flaring the opening with another jig inserted thereinto (FIG. 4C), so as to form the conical frustum-shaped portion 182 (a diametrically expanding step, FIG. 4D). In the example shown in these FIGs., an outer surface of the apical portion 188 becomes the bottom base C of the conical frustum-shaped portion 182, and the slanted side 186 of the opening 185 in the apical portion 188 becomes the slanted side 184 of the conical frustum-shaped portion 182, eventually.

Then the bottom base C of the conical frustum-shaped portion 182 is pressed against the main surface B. Finally the welding step is performed, just like in the first embodiment.

According to the aforementioned method, the slanted side 186 makes an obtuse angle with the main surface B just like the slanted side 184 pertaining to the first embodiment, without using the pressing die A after the pressing process. Also, the entire bottom base C is in contact with the main surface B, just like in the first embodiment. Therefore, the second embodiment 2, which incorporates the above-described electrode terminal element 18a, can not only achieve the same effect as the first embodiment in the welding step of welding the conical frustum-shaped portion 182 to the current collector 22, but also further simplify the manufacturing process.

<Manufacturing Embodiment Examples>

Inventors of the present invention have manufactured the battery of the first embodiment as an embodiment example, and evaluated its battery performance through various experiments.

(Quality Evaluation of Laser-Welding)

The inventors manufactured (i) embodiment examples, each of which is the battery 1 having the conical frustum-shaped portion 182 and (ii) comparative examples, each of which is the same as the embodiment example except that it has the plate-like portion 182x. In each of the embodiment and comparative examples, the inventors laser-welded a negative electrode terminal to a current collector. Later they visually examined for poor welding at weld spots. The laser beam was set at pulse width 1.6 ms, pitch 0.22, output 1.0 J/p, and beam angle 10 degrees.

Results of this experiment are shown in Table 1.

TABLE 1

Results of Qualify Evaluation of Laser-Welding

| | Embodiment Examples | Comparative Examples |
|---|---|---|
| Poor Welding | confirmed in 0 out of 500 batteries | confirmed in 74 out of 500 batteries |

TABLE 1-continued

Results of Qualify Evaluation of Laser-Welding

| | Embodiment Examples | Comparative Examples |
|---|---|---|
| Breakdown of Defects | n/a | sputtering: confirmed in 11 out of 500 batteries; poor welding (only the terminal was melted): confirmed in 63 out of 500 batteries |

* Manufactured batteries, both embodiment and comparative examples, each had a size of 4.2 × 33.7 × 42.5 (mm).
* The laser beam was set at pulse width 1.6 ms, pitch 0.22, output 1.0 J/p, and beam angle 10 degrees. The taper angle of the slanted side of the conical frustum-shaped portion was set at 30-60 degrees.

As indicated by the results of the experiment shown in Table 1, the inventors confirmed that in some of the comparative examples, only the perimeter of the slanted side 184x of the plate-like portion 182x was melted, with the result that the plate-like portion 182x failed to partially melt and merge with the current collector 22—i.e., the plate-like portion 182x was merely in contact with the current collector 22 (these batteries are referred to as poorly welded batteries). The inventors also confirmed that, in some of the comparative examples, a part of the plate-like portion 182x was lost due to sputtering (these batteries are referred to as sputtered batteries), although fewer in number than the poorly welded batteries.

In contrast to the comparative examples, the embodiment examples obtained significant improvements in welding. Out of 500 embodiment examples, none had the problem of poor welding. In this view, it is confirmed that the weld spots in the embodiment examples are securely formed owing to use of the conical frustum-shaped portion 182.

(Evaluation of Battery Reliability)

Predetermined drop test, heat shock test, and high-temperature and high-humidity test were performed on both the embodiment and comparative examples that had been subjected to the aforementioned laser-welding. The inventors then evaluated battery reliability after each test, based on the increase in the internal resistance value of each battery. The number of embodiment examples and comparative examples on which these tests were performed was N=10 each.

Conditions and results of the tests are shown in Table 2.

TABLE 2

Results of Evaluation of Battery Reliability

| | | Comparative Examples | |
|---|---|---|---|
| | Embodiment Examples | Sputtered Batteries | Poorly Welded Batteries |
| Drop Test*[1] | Avg. +11.7 mΩ (+9.9 to +15.1) | Avg. 143.8 mΩ (+68.4 to +224.7) | Avg. +36.8 mΩ (+10.3 to +183.2)*[4] |
| Heat Shock Test*[2] | Avg. +22.4 mΩ (+20.9 to +24.2) | Avg. +27.3 mΩ (+21.3 to +40.3) | Avg. +21.9 mΩ (+20.3 to +22.7) |
| High-temp. High-humid. Test*[3] | Avg. +19.6 mΩ (+18.3 to +20.8) | Avg. 73.0 mΩ (+23.0 to +190.5) | Avg. +19.9 mΩ (+18.5 to +21.7) |

*[1]When in a discharge state, each battery was dropped onto concrete from a height of 1.65 m.
*[2]Fully discharged batteries were let stand firstly at −30° C. for 30 minutes, then at 70° C. for 30 minutes. This cycle was repeated 1000 times.
*[3]Fully charged batteries were let stand at 70° C. and 90% humidity for 20 days.
*[4]Due to consecutive shocks, the negative electrode terminal came off the collector in 3 out of 10 batteries.

As a result of the drop test, it is confirmed that the sputtered batteries and the poorly welded batteries of the comparative examples both experienced a significant increase in the internal resistance value. One possible reason for such an increase in the internal resistance value is that, because the negative electrode terminal 18x and the current collector 22 in each comparative example are not welded at weld spots in an intended manner, the electrolyte infiltrates into the weld spots due to the shock/vibration of the drop, rendering the electrical conductivity between the negative electrode terminal 18x and the current collector 22 unstable. Furthermore, the inventors confirmed that the negative electrode terminal 18x came off the current collector 22 in 3 out of 10 poorly welded batteries, because a mechanical load was consecutively applied to the inside of the batteries. In these 3 poorly welded batteries, the electrical conductivity between the negative electrode terminal 18x and the current collector 22 was unstable, just like in the sputtered batteries described earlier.

On the other hand, in the embodiment examples, the negative electrode terminal 18 is securely welded to the current collector 22 due to use of the conical frustum-shaped portion 182. It is therefore considered that each embodiment example retains an excellent electrical conductivity and alleviates the increase in the internal resistance value, even when the shock/vibration of the drop has caused the stated infiltration of electrolyte.

This stability of the electrical conductivity was mostly confirmed in the embodiment examples subjected to the heat shock test and the high-temperature and high-humidity test as well. That is to say, although the internal resistance value increased in both of the embodiment and comparative examples after performing each test, there was less variation in the increase of the internal resistance value between the embodiment examples, and the extent of the increase was small in the embodiment examples. In this view, it can be said that the embodiment examples are evidently superior to the comparative examples.

The superiority of the present invention has been confirmed from performing the above experiments on the embodiment examples.

<Additional Remarks>

The above embodiments have described an example in which the present invention is applied (but not limited) to a lithium-ion battery. The present invention may also be applied to a nickel-metal hydride battery and various other types of batteries.

Further, the first embodiment has exemplarily depicted the electrode assembly 14 formed by rolling the belt-like negative and positive electrode plates 11 and 12 that have been layered with the separator 13 sandwiched therebetween. However, it is permissible to use an electrode assembly formed by layering rectangular-shaped (stacked) electrodes and separators.

Each embodiment has exemplarily described the structure of the conical frustum-shaped portion 182 in the electrode terminal 18 and a manufacturing method therefor. However, if the shaft portion 181 of the electrode terminal 18 has a rectangular or polyhedral shape, implementing the manufacturing method described in each embodiment may lead to the formation of a rectangular or polygonal frustum-shaped portion. Hence, in the present invention, the frustum-shaped portion formed in the first end of the shaft portion is not limited to a conical frustum-shaped portion, but may be such a rectangular or polygonal frustum-shaped portion.

Figure 2C:
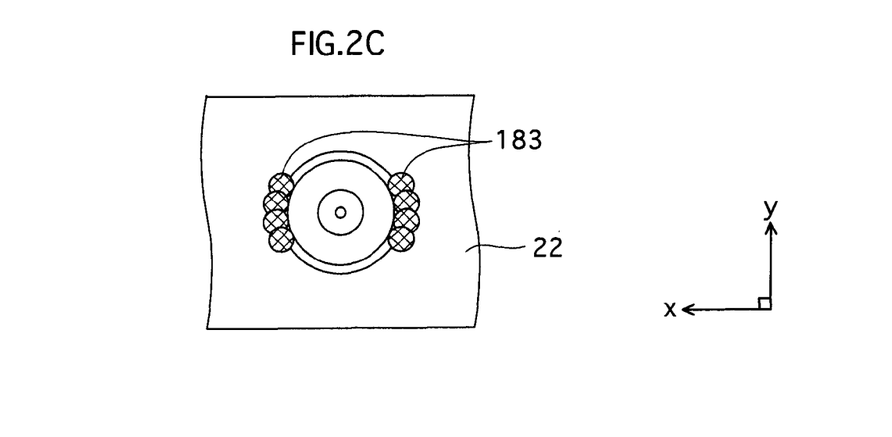

The present invention aims to solve the problem of poor welding between the current collector 22 and the electrode terminal 18 by forming the plate-like portion 182x of the electrode terminal element 18x into the conical frustum-shaped portion 182 or the like. Accordingly, the plate-like portion 182x may be formed in such a manner that the plate-like portion 182x is tapered to make a slanted side 184 (as in FIG. 2) only partially—i.e., only in the area to be welded. With this structure, the same effect as that derived from each embodiment can be expected.

Also, the weld spots 183 have been exemplarily described to be formed by laser-welding. This, however, is not a limitation of the present invention. The welding posts 183 may be formed by using other energy beams. Further, a shape of each weld spot is not limited to something recognizable from its outer appearance. Alternatively it is permissible to form, for example, a weld spot 183 composed of multiple weld spots that, as a whole, form a line by being adjacent to one another.

It should be noted that the sealed battery and the manufacturing method therefor pertaining to the present invention can be used, for example, in a manufacturing method for a rectangular lithium-ion battery for use as a general power source.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A manufacturing method for a sealed battery, comprising:
    a first step of (i) causing a terminal element, which is composed of a shaft portion and an apical portion provided in a first end of the shaft portion, to penetrate through a current collector such that the apical portion projects out from the current collector, (ii) shaping the apical portion into a plate-shaped portion by expanding the apical portion diametrically and (iii) pressing the plate-shaped portion against the current collector;
    a second step of shaping the plate-shaped portion into a frustum-shaped portion whose bottom base is facing the current collector, wherein the plate-shaped portion is shaped into the frustum-shaped portion by deforming the plate-shaped portion using a pressing die having a depression with a shape of a conical frustum; and
    a third step of welding the bottom base of the frustum-shaped portion and the current collector together in at least one area on a perimeter of the bottom base of the frustum-shaped portion, such that the bottom base of the frustum-shaped portion is in contact with the current collector.

2. The manufacturing method of claim 1, wherein
    in the second step, an angle formed by a main surface of the current collector and a slanted side of the frustum-shaped portion is adjusted to fall in a range of 120 degrees to 150 degrees inclusive.

3. A manufacturing method for a sealed battery, comprising:
    a first step of causing a terminal element, which is composed of a shaft portion and an apical portion provided in a first end of the shaft portion, to penetrate through a current collector such that the apical portion projects out from the current collector, wherein the apical portion has an opening that connects to an external space in the penetration direction, and an inner surface of the apical portion surrounding the opening at a distal end of the terminal is slanted so as to approach a longitudinal center of the shaft portion;
    a second step of forming a frustum-shaped portion whose bottom base is facing the current collector by (i) diametrically expanding the apical portion by flaring the opening with a jig inserted thereinto and (ii) pressing the frustum-shaped portion against the current collector; and a third step of welding the frustum-shaped portion and the current collector in at least one area on a perimeter of the bottom base of the frustum-shaped portion.

4. The manufacturing method claim 3, wherein in the second step, an angle formed by a main surface of the current collector and a slanted side of the frustum-shaped portion is adjusted to fall in a range of 120 degrees to 150 degrees inclusive.

\* \* \* \* \*